(12) United States Patent
Kim (10) Patent No.: US 10,787,250 B2
(45) Date of Patent: Sep. 29, 2020

(54) MULTI-COPTER WITH INTERMEDIATE SUPPORTING BAR FOR REDUCING FUSELAGE VIBRATION AND CONTROL METHOD OF REDUCING FUSELAGE VIBRATION THEREOF

(71) Applicant: KOREA AEROSPACE RESEARCH INSTITUTE, Daejeon (KR)

(72) Inventor: Tae Joo Kim, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 304 days.

(21) Appl. No.: 15/960,008

(22) Filed: Apr. 23, 2018

(65) Prior Publication Data

US 2018/0305002 A1    Oct. 25, 2018

(30) Foreign Application Priority Data

Apr. 24, 2017    (KR) .................. 10-2017-0052401

(51) Int. Cl.
*B64C 27/00* (2006.01)
*B64C 39/02* (2006.01)

(52) U.S. Cl.
CPC .......... *B64C 27/001* (2013.01); *B64C 39/024* (2013.01); *B64C 2201/024* (2013.01); *B64C 2201/027* (2013.01)

(58) Field of Classification Search
CPC ................ B64C 2201/027; B64C 27/08
See application file for complete search history.

(56) References Cited

U.S. PATENT DOCUMENTS

| 5,148,402 A | * | 9/1992 | Magliozzi | B64C 11/50 244/1 N |
| 5,789,678 A | * | 8/1998 | Pla | B64C 11/50 244/1 N |
| 9,764,835 B1 | * | 9/2017 | Kimchi | B64C 39/024 |
| 2016/0083073 A1 | * | 3/2016 | Beckman | G09F 13/00 40/463 |
| 2017/0043870 A1 | * | 2/2017 | Wu | B64D 47/08 |
| 2019/0291862 A1 | * | 9/2019 | Lyasoff | G05D 1/102 |

FOREIGN PATENT DOCUMENTS

| JP | 2011-046355 A | 3/2011 |
| KR | 20-2014-0004877 U | 9/2014 |
| WO | WO-2016/192021 | 12/2016 |

* cited by examiner

*Primary Examiner* — Richard G Davis
(74) *Attorney, Agent, or Firm* — Rabin & Berdo, P.C.

(57) ABSTRACT

Provided is a multi-copter, including: a fuselage; three or more intermediate supporting bars which have one ends fixed to the fuselage and radially extend from the fuselage; two mounting rods which are divided into two branches at the other ends of the intermediate supporting bars; and a propeller set configured by two propellers which are mounted to two mounting rods and rotate at the same rotational speed (RPM) in opposite directions. When an angle formed by any one propeller between two propellers which form the propeller set and the mounting rod is a first angle and an angle formed by the other one propeller and the mounting rod is a second angle, a difference between the first angle and the second angle is 360/2n degrees and n is a number of blades for every propeller.

4 Claims, 10 Drawing Sheets

----- Vibration A   ——— Vibration B   —●— Sum of Vibration

MULTI-COPTER WITH INTERMEDIATE SUPPORTING BAR FOR REDUCING FUSELAGE VIBRATION AND CONTROL METHOD OF REDUCING FUSELAGE VIBRATION THEREOF

CROSS-REFERENCE TO RELATED APPLICATIONS

This application claims the priority of Korean Patent Application No. 10-2017-0052401 filed on Apr. 24, 2017, in the Korean Intellectual Property Office, the disclosure of which is incorporated herein by reference.

BACKGROUND

Field

The present disclosure relates to a vibration reducing technique which reduces vibration transmitted to a fuselage using an operation of a propeller in a multi-copter and an intermediate supporting bar and uses a phase difference of vibrations in accordance with rotation of the propeller and a principle that a sum of the vibrations having the same frequency is increased or decreased according to a phase angle and more particularly, to a control method which disposes an intermediate supporting bar between a propeller and a fuselage of a multi-copter and configures a pair of multi-copter propellers as one set to add the vibrations generated in the pair of propellers in the intermediate supporting bar to be reduced so that the vibration of the propeller is not directly transmitted to the multi-copter fuselage but a vibration reduced in the intermediate supporting bar is transmitted.

Description of the Related Art

Figure 1:
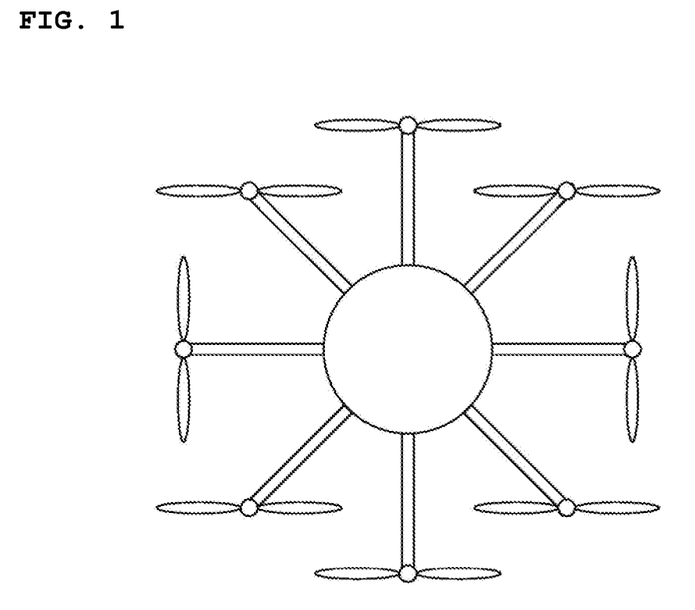
FIG. 1 is a typical shape of an octocopter among the multi-copters.

Recently, since the multi-copter can take-off and land in a narrow space and can be easily handled, the multi-copter is utilized in various fields. Further, since the multi-copter generates lift through a plurality of rotators (propellers) and is utilized in various fields, recently, the usage of multi-copter is significantly increased. Furthermore, the multi-copter is used to capture images at various angles to provide vivid images. FIG. 1 is a schematic shape of an octocopter among the multi-copters. Generally, the multi-copter is formed such that a supporting rod is radially provided in a fuselage and the propeller is provided in the supporting rod together with a motor.

However, since the multi-copter generates lift and a control force due to rotation of the propeller, when a vibration generated in accordance with the rotation of the propeller causes a problem, the vibration may be an important problem which needs to be solved to capture a high quality image. That is, the vibration generated in the propeller is transmitted to a camera provided in the multi-copter to interrupt accurate image capturing or deteriorate an image quality of the captured image.

In order to solve the above-described problem, a gimbal anti-vibration member or a gimbal anti-vibration damper for removing vibrations transmitted to the gimbal is used for multi-copters which are used for high-altitude photography so as not to cause the shaken image of the camera. An example of the related art is disclosed in Korean Unexamined Utility Model Application Publication No. 20-2014-0004877 (Title: Anti-vibration member and camera gimbal anti-vibration damper including the same).

According to the related art, anti-vibration members which are formed to be separable are organically combined to a plurality of panels to remove the vibration transmitted to a camera gimbal. The gimbal anti-vibration damper reduces the vibration using a fuselage fixing member which is fixedly connected to a first panel having a plate-shaped portion and a multi-copter to support the first panel and a first anti-vibration member which is interposed between the plate-shaped portion of the first panel and the fuselage fixing member to buffer vibration transmitted to the fuselage fixing member.

That is, in the related art, as a device for attenuating vibration in accordance with the rotation of the multi-copter propeller, a plurality of panels, a fixing body, and an anti-vibration member are additionally provided. However, addition of such structures or functional bodies is not only disadvantageous in terms of the load, but also causes an additional cost for manufacturing and assembling the separate components.

SUMMARY

An object to be achieved by the present disclosure is to provide a method of minimizing the vibration only by a method of operating a propeller of a multi-copter without adding additional structures or functional bodies to the multi-copter.

Another object to be achieved by the present disclosure is to provide a method of controlling vibrations transmitted to a fuselage of the multi-copter by disposing a set of multi-copter propellers in which vibrations are attenuated by each other and attenuating the vibrations generated in the set during an intermediate step before reaching the fuselage.

According to an aspect of the present disclosure, there is provided a multi-copter with an intermediate supporting bar, including: a fuselage; a plurality of intermediate supporting bars which has one ends fixed to the fuselage and radially extends from the fuselage; two mounting rods which are divided into two branches at the other ends of the intermediate supporting bars; and a propeller set configured by two propellers which are mounted in two mounting rods and rotate at the same rotational speed (RPM) in opposite directions.

When an angle formed by any one propeller between two propellers which form the propeller set and the mounting rod is a first angle and an angle formed by the other one propeller and the mounting rod is a second angle, a difference between the first angle and the second angle may be 360/2n degrees (here, n is a number of blades for every propeller).

Two mounting rods which are formed to be divided at the other end of the intermediate supporting bar are perpendicular to each other, four intermediate supporting bars may be provided, and four propeller sets may be radially formed with respect to the fuselage.

According to another aspect of the present disclosure, there is provided a fuselage vibration control method of a multi-copter which is configured by three or more intermediate supporting bars which have one ends fixed to a multi-copter fuselage and radially extend from the fuselage, two mounting rods which are divided into two branches at the other ends of the intermediate supporting bar, and a propeller set configured by two propellers mounted in two mounting rods. The method includes a phase angle optimizing step of fixing a first angle formed by any one propeller between two propellers which form the propeller set and the mounting rod and a second angle formed by the other propeller and the mounting rod to be different by 360/2n degrees; and a rotating step of rotating two propellers of the propeller set at the same rotational speed (RPM) in opposite directions.

In the rotating step, vibrations generated from two propellers which form the propeller set may be added in the intermediate supporting bar to be cancelled.

According to the present disclosure, the vibration may be minimized only by a method of operating a propeller of a multi-copter without adding additional structures or functional bodies to the multi-copter. Further, vibrations of one pair of propellers which form one set are added to reduce the vibrations so that the vibrations generated in the propeller are not directly transmitted to the multi-copter fuselage, thereby reducing the fuselage vibration.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

Objects, specific advantages, and novel features of the present disclosure will be more apparent from the following detailed description and exemplary embodiments associated with the accompanying drawings. Further, the terms used in the description are defined considering the functions of the present disclosure and may vary depending on the intention or usual practice of a user or operator. Accordingly, the terms need to be defined base on details throughout this specification.

Figure 2:
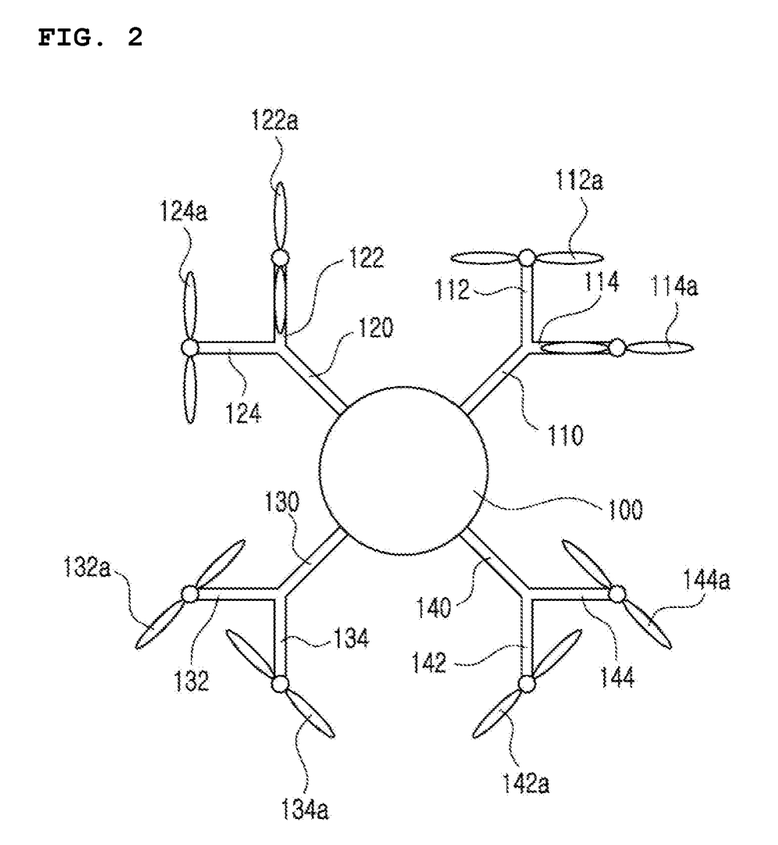
FIGS. 2 and 3 are schematic shapes of a multi-copter according to an exemplary embodiment of the present disclosure.
Figure 3:
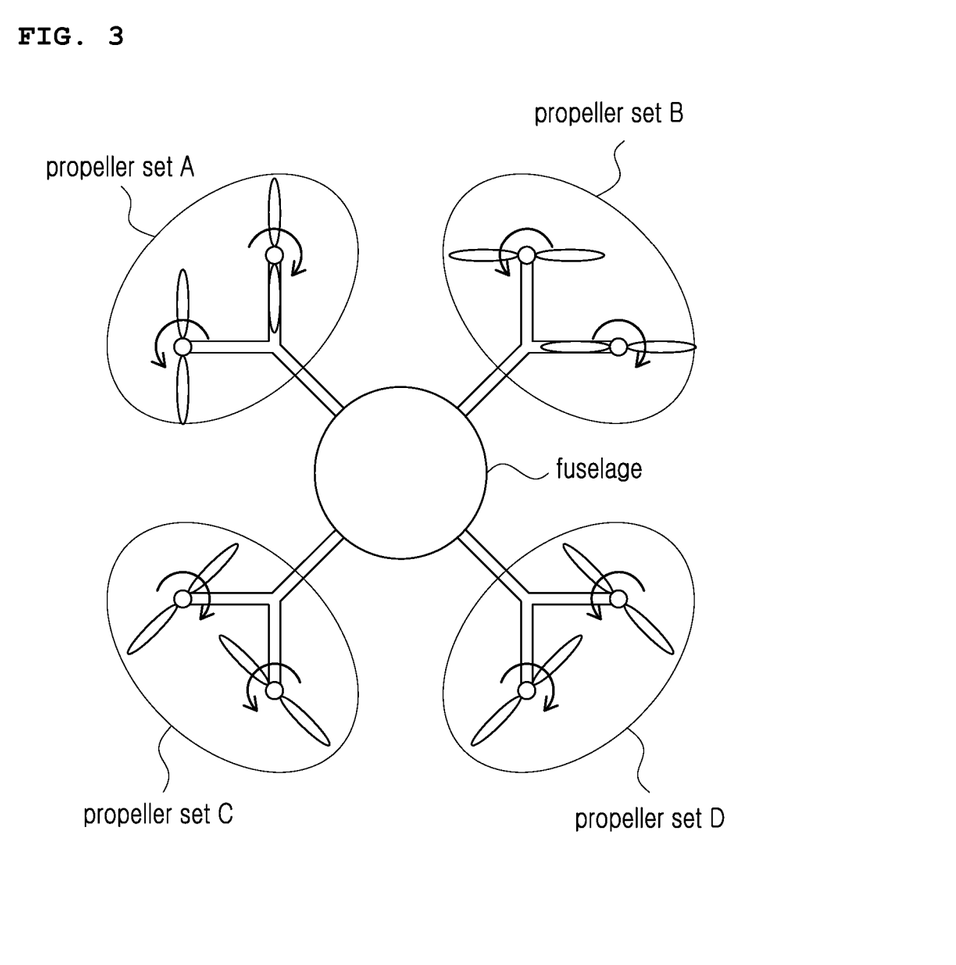

FIGS. 2 and 3 are schematic shapes of a multi-copter according to an exemplary embodiment of the present disclosure.

A multi-copter according to the present disclosure will be described with reference to the drawings. The multi-copter of the present disclosure includes a fuselage 100 and a plurality of intermediate supporting bars 110, 120, 130, and 140 which have one ends fixed to the fuselage and radially extends from the fuselage. Here, three or more intermediate supporting bars according to the present disclosure may be provided (propellers are six or more). Hereinafter, for the convenience of description, it is described that four intermediate supporting bars are provided.

The intermediate supporting bars 110, 120, 130, and 140 are formed by a first intermediate supporting bar 110, a second intermediate supporting bar 120, a third intermediate supporting bar 130, and a fourth intermediate supporting bar 140 whose one ends are radially connected to the fuselage.

The other end of the first intermediate supporting bar 110 is divided into two branches to form a first-first mounting rod 112 and a first-second mounting rod 114. Here, desirably, the first-first mounting rod 112 and the first-second mounting rod 114 are perpendicular to each other. A first-first propeller 112a and a first-second propeller 114a are mounted in the first-first mounting rod 112 and the first-second mounting rod 114, respectively. Here, the first-first propeller 112a and the first-second propeller 114a rotate in opposite directions at the same rotational speed (RPM A) and are referred to as a set A for the sake of convenience. A number of blades of the first-first propeller 112a and the first-second propeller 114a may be two to four and in the present exemplary embodiment, an example in which the number of propeller blades is two will be described.

The other end of the second intermediate supporting bar 120 is divided into two branches to form a second-first mounting rod 122 and a second-second mounting rod 124. Here, desirably, the second-first mounting rod 122 and the second-second mounting rod 124 are perpendicular to each other. A second-first propeller 122a and a second-second propeller 124a are mounted in the second-first mounting rod 122 and the second-second mounting rod 124, respectively. Here, the second-first propeller 122a and the second-second propeller 124a rotate in opposite directions at the same rotational speed (RPM B) and are referred to as a set B for the sake of convenience.

The other end of the third intermediate supporting bar 130 is divided into two branches to form a third-first mounting rod 132 and a third-second mounting rod 134. Here, desirably, the third-first mounting rod 132 and the third-second mounting rod 134 are perpendicular to each other. A third-first propeller 132a and a third-second propeller 134a are mounted in the third-first mounting rod 132 and the third-second mounting rod 134, respectively. Here, the third-first propeller 132a and the third-second propeller 134a rotate in opposite directions at the same rotational speed (RPM C) and are referred to as a set C for the sake of convenience.

The other end of the fourth intermediate supporting bar 140 is divided into two branches to form a fourth-first mounting rod 142 and a fourth-second mounting rod 144. Here, desirably, the fourth-first mounting rod 142 and the fourth-second mounting rod 144 are perpendicular to each other. A fourth-first propeller 142a and a fourth-second propeller 144a are mounted in the fourth-first mounting rod 142 and the fourth-second mounting rod 144, respectively. Here, the fourth-first propeller 142a and the fourth-second propeller 144a rotate in opposite directions at the same rotational speed (RPM D) and are referred to as a set D for the sake of convenience.

Hereinafter, the set A, the set B, the set C, and the set D in which two propellers rotating at the same rotational speed in opposite directions form one set are simply referred to as a "propeller set".

Hereinafter, a principle of vibration reduction according to a phase angle of the multi-copter propeller according to the present disclosure will be described.

Figure 4:
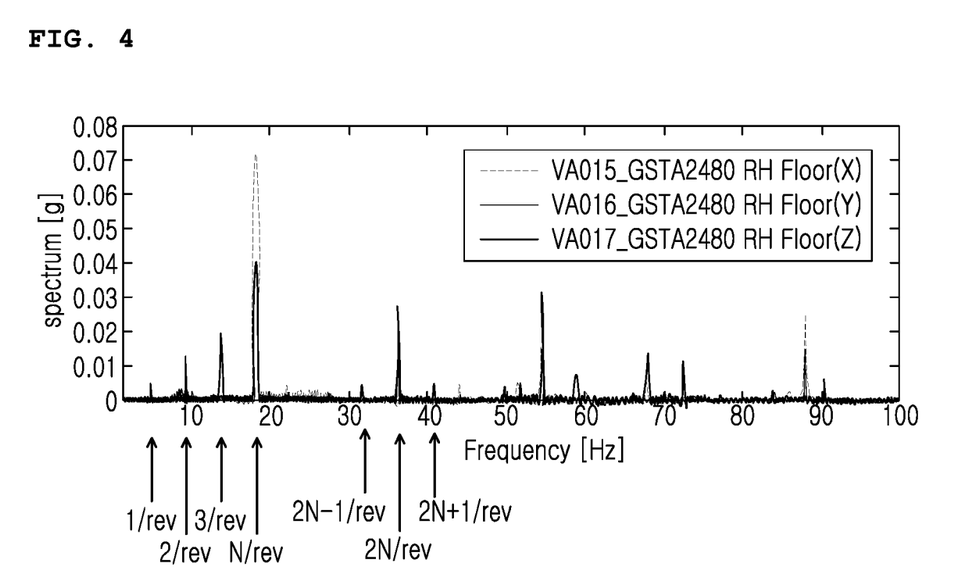
FIG. 4 illustrates a vibration spectrum of a helicopter fuselage.

As illustrated in FIG. 4, when the static balance is adjusted (a center of gravity of propellers are adjusted at the same position), a magnitude of the vibration which is generated due to the rotational motion of a rotating body, such as a propeller, is the largest at a frequency of N/rev. Here, N/rev is a numerical value obtained from multiplying a frequency (1/rev) when a rotating body rotates one time and the number N of propellers.

Figure 5:
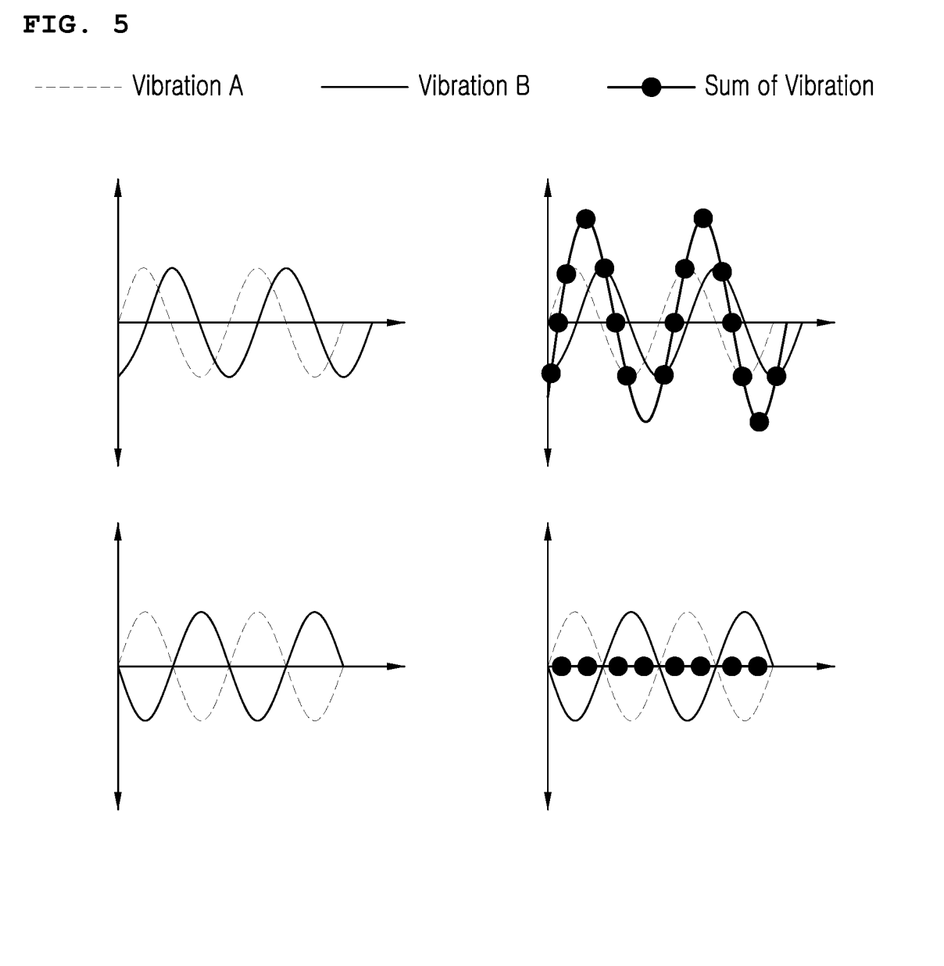
FIG. 5 illustrates that vibrations with the same frequency are added according to a phase angle.

Further, as illustrated in FIG. 5, a sum of vibrations at a frequency may be increased or decreased according to a phase angle. Therefore, when two propellers with the same size which are connected to the supporting bars with the same size in the multi-copter fuselage rotate at the same RPM (rotational speed) and phase angles which are 180 degrees different, vibrations generated in the propellers are transmitted to the fuselage so that the vibrations are cancelled by each other.

The present disclosure uses the above-described principle so that two propellers used for flight of the multi-copter form one set and phase angles of the two propellers of each set are maintained to be 180 degrees at the same RPM to minimize the vibration. Therefore, in one set, the vibrations are cancelled.

A principle that the vibration transmitted to the fuselage 100 is reduced in the multi-copter according to the present disclosure will be described with the propellers in the set A as an example for the sake of convenience.

As illustrated in FIG. 3, the first-first propeller 112a and the first-second propeller 114a which form the set A rotate at the same rotational speed (RPM A) in opposite directions. The reason is that two propellers which form the same set rotate in opposite directions to cancel torques by the propellers.

Two propellers in the same set rotate at the same rotational speed. However, for maneuvering flight, propellers in different sets need to rotate at different rotational speeds. That is, in the present disclosure, the propellers in the same set need to rotate at the same rotational speeds and the propellers in different sets rotate at different rotational speed for maneuvering flight to change the direction. In order to control the multi-copter to smoothly perform the maneuvering flight, the multi-copter needs to be operated by at least six propellers and desirably, the multi-copter is operated by eight propellers.

The first-first propeller 112a and the first-second propeller 114a which configure the set A are configured with the perfectly same size in the multi-copter fuselage 100. That is, when the first-first propeller 112a and the first-second propeller 114a share the first intermediate supporting bar 110 and are attached to the multi-copter by means of the first-first mounting rod 112 and the first-second mounting rod 114, first-first mounting rod 112 and the first-second mounting rod 114 form the same angle with respect to the first intermediate supporting bar. Therefore, theoretically, when the first-first propeller 112a and the first-second propeller 114a rotate at the same rotational speed (RPM A) in opposite directions, the phase angle is 180 degrees. Therefore, the vibrations generated from the propellers may be cancelled by each other.

Further, in the multi-copter of the present disclosure, a point at which the vibrations generated in two propellers of the set A are cancelled is the intermediate supporting bar located between the fuselage and the propeller, rather than in the fuselage. That is, the vibrations generated in the first-first propeller 112a and the first-second propeller 114a of the set A are added in the first intermediate supporting bar 110. In this case, the phase difference is 180 degrees so that the vibrations are cancelled by each other.

As described above, the intermediate supporting bar which connects one set of propellers to the fuselage is configured by one frame so that the vibration generated in the propellers are not transmitted to the fuselage of an airframe. By doing this, the vibrations transmitted to the fuselage are reduced so that the vibration propagated to other structures such as a camera which is suspended to a lower portion of the fuselage may be remarkably reduced. That is, the vibrations generated in the propellers are collected at one pointer to be reduced and then transmitted to the fuselage. Therefore, it is possible to suppress the vibration from being transmitted to the fuselage.

Referring to FIG. 3, in two propellers of the set A, relative positions of one pair of propellers in which a phase difference is 180 degrees so that the vibrations are cancelled are related to an angle formed by each propeller and a structure to which the propeller is mounted.

The relative position of two propellers of the set A is formed such that when a blade of one propeller is located on the structure (that is, parallel to the structure) with respect to the structure (the first-first mounting rod 112 and the first-second mounting rod 114 in FIG. 3) connected to the fuselage, a blade of the other one propeller is located behind (or before) 360/2n degrees.

Figure 6:
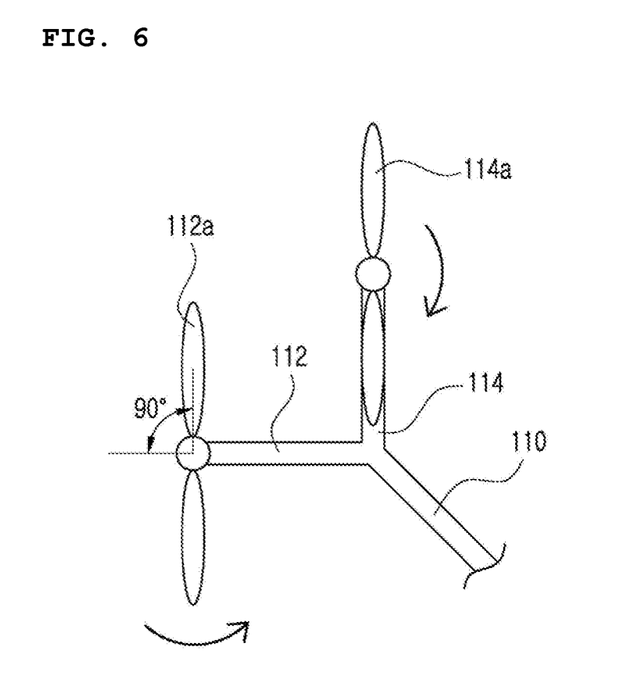
FIGS. 6 and 7 illustrate that propellers which form one set in a multi-copter according to the present disclosure are attached and illustrate a relative angle between a mounting rod and a propeller blade when two propeller blades are provided.
Figure 7:
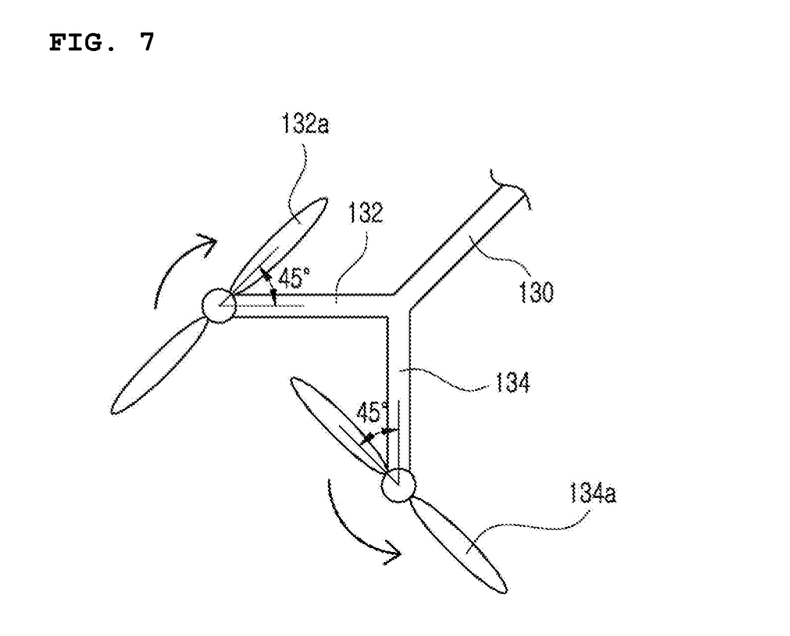

This will be described with reference to FIGS. 6 and 7. FIGS. 6 and 7 illustrate that propellers which form one set in the multi-copter according to an exemplary embodiment of the present disclosure are attached. Referring to FIG. 6, when two propeller blades are provided, a relative angle between the mounting rod and the propeller blade is illustrated, Here, since the number of propeller blades is two, n=2. Further, when the first-first mounting rod 112 and the blade of the first-first propeller 112a are parallel to each other, the first-second mounting rod 114 and the blade of the first-second propeller 114a are located behind (or before) 360/2n degrees (that is, 90 degrees). FIG. 7 illustrates a relative position of two propellers of the set C and it is understood that two propellers form the same angle as described with reference to FIG. 6 (the propeller blade rotates by 45 degrees from the state illustrated in FIG. 6).

However, in an actual product, a phase angle at which the vibration is minimized may be found by fixing the rotational speed and the phase angle of one propeller of the set A and slightly changing a phase angle of the other one propeller while maintaining the same rotational speed. By doing this, the first-first propeller 112a and the first-second propeller 114a of the set A rotate at the same rotational speed while forming the relative phase angle found as described above to cancel the vibrations.

Although the principle of vibration cancellation of the multi-copter of the present disclosure has been described above with the set A as an example, the same principle is applied to the second-first propeller 122a and the second-second propeller 124a which form the set B, the third-first propeller 132a and the third-second propeller 134a which form the set C, and the fourth-first propeller 142a and the fourth-second propeller 144a which form the set D.

In the above description, the number of propeller blades is two. However, the same relative angle is applied to the cases in which the number of propeller blades is three (see FIG. 8) and four (see FIG. 9).

Figure 8:
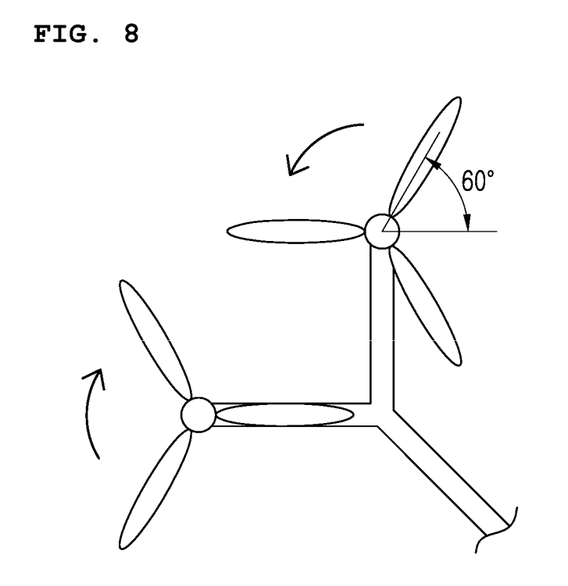
FIGS. 8 and 9 illustrate that propellers which form one set in a multi-copter according to the present disclosure are attached and illustrate relative angles between a mounting rod and a propeller blade when propeller blades are three and four, respectively.

Referring to FIG. 8, the number of propeller blades is three so that n=3. As the relative angle of the mounting rod and the propeller blade, when the first-first mounting rod 112 and the blade of the first-first propeller 112a are parallel to each other, the first-second mounting rod 114 and the blade of the first-second propeller 114a are located behind (or before) 360/2n degrees (that is, 60 degrees).

Figure 9:
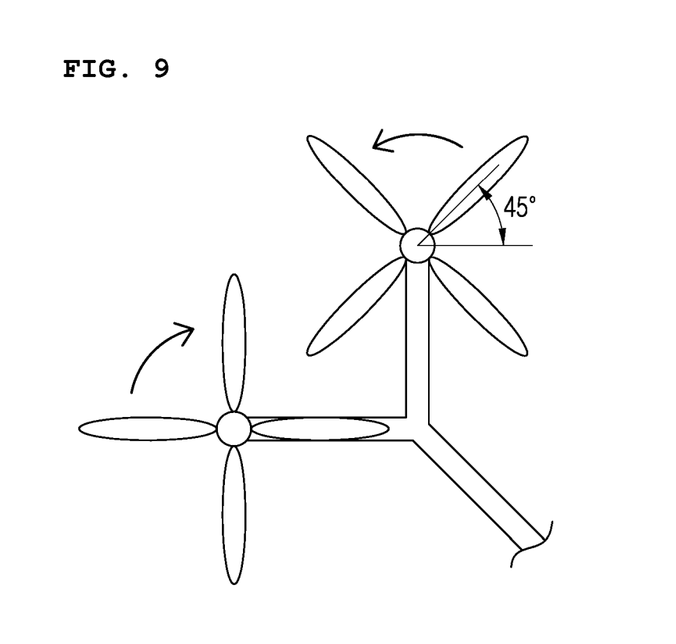

Referring to FIG. 9, the number of propeller blades is four so that n=4. As the relative angle of the mounting rod and the propeller blade, when the first-first mounting rod 112 and the blade of the first-first propeller 112a are parallel to each other, the first-second mounting rod 114 and the blade of the first-second propeller 114a are located behind (or before) 360/2n degrees (that is, 45 degrees).

Figure 10:
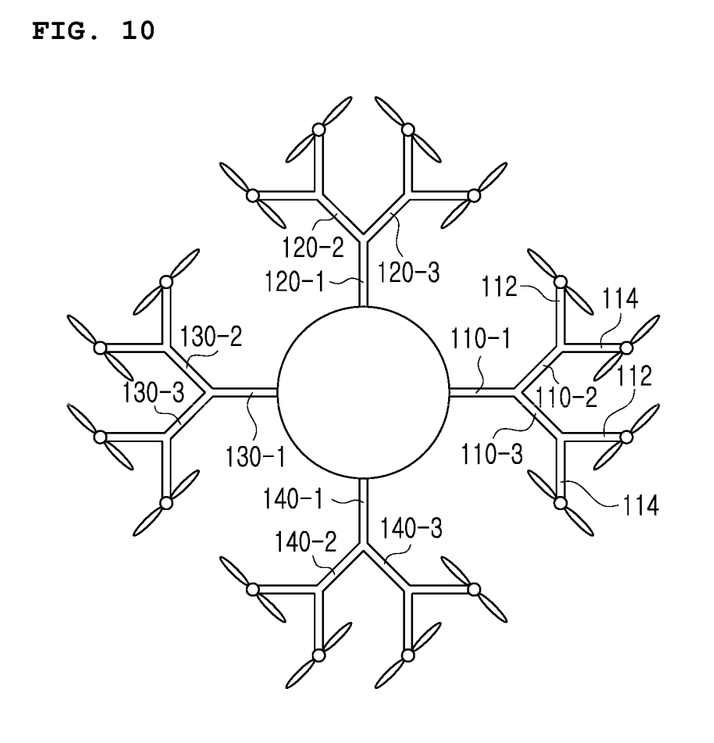
FIG. 10 illustrates a multi-copter including an intermediate supporting bar according to another exemplary embodiment of the present disclosure.

FIG. 10 illustrates a multi-copter including an intermediate supporting bar according to another exemplary embodiment of the present disclosure.

A multi-copter according to the present exemplary embodiment includes a fuselage 100 and a plurality of intermediate supporting bars which has one ends fixed to the fuselage and radially extends from the fuselage. The other end of each intermediate supporting bar is divided into two branches to form two mounting rods which are perpendicular to each other and mounted with propellers. Two propellers rotate at the same rotational speed in opposite directions and such a configuration is similar to the exemplary embodiment illustrated in FIG. 2. However, the intermediate supporting bar according to the present exemplary embodiment illustrated in FIG. 9 is different from the intermediate supporting bar illustrated in FIG. 2 in that the intermediate supporting bar is configured by two supports which are perpendicularly divided.

That is, the intermediate supporting bar according to the exemplary embodiment of FIG. 2 is four intermediate supporting bars which are configured by a first intermediate supporting bar 110, a second intermediate supporting bar 120, a third intermediate supporting bar 130, and a fourth intermediate supporting bar 140. The intermediate supporting bar according to the exemplary embodiment illustrated in FIG. 10 has branch portions which are perpendicularly divided to have a Y shape.

That is, the first intermediate supporting bar of the present exemplary embodiment is configured by a first-first supporting bar 110-1 and a first-second supporting bar 110-2 and a first-third supporting bar 110-3 divided from the first-first supporting bar, the second intermediate supporting bar is configured by a second-first supporting bar 120-1 and a second-second supporting bar 120-2 and a second-third supporting bar 120-3 divided from the second-first supporting bar, the third intermediate supporting bar is configured by a third-first supporting bar 130-1 and a third-second supporting bar 130-2 and a third-third supporting bar 130-3 divided from the third-first supporting bar, and the fourth intermediate supporting bar is configured by a fourth-first supporting bar 140-1 and a fourth-second supporting bar 140-2 and a fourth-third supporting bar 140-3 divided from the fourth-first supporting bar.

Also in the present exemplary embodiment, two propellers form one set so that in the two propellers of each set, the same RPM and 180 degrees of the phase angle are maintained so that the vibrations are cancelled during the process of transmitting the vibrations of the propellers to the fuselage. In particular, the intermediate supporting bar has a structure which is divided to be Y shaped so that the vibrations may be further cancelled while passing the intermediate supporting bar.

According to a method of controlling a fuselage vibration of the multi-copter configured as described above, after performing an angle optimizing step of disposing two propellers which form one set at an angle at which the vibrations generated from two propellers are minimized, a rotating step of rotating two propellers which form one set at the same rotational speed (RPM) in opposite directions is used to minimize the vibration transmitted to the fuselage. Here, in the angle optimizing step, a rotational speed and a phase angle of any one propeller are fixed and a phase angle of the other propeller is adjusted while maintaining the rotational speed to find a relative phase angle at which the sum of vibrations of two propellers is minimized.

According to the present disclosure, vibrations generated in two propellers which form one set are added in the intermediate supporting bar to be cancelled so that the vibrations which are directly transmitted to the multi-copter fuselage are remarkably reduced.

Although the exemplary embodiment of the present disclosure has been described in detail, the scope of the present disclosure is not limited to the disclosed embodiments, but, on the contrary, is intended to cover various modifications and equivalent arrangements included within the spirit and scope of the appended claims.

What is claimed is:

1. A multi-copter with an intermediate supporting bar, comprising:
   a fuselage;
   a plurality of intermediate supporting bars each having one end fixed to the fuselage and radially extending from the fuselage;
   two mounting rods which are divided into two branches at respective other ends of the intermediate supporting bars; and
   a propeller set having two propellers which are mounted in respective ones of the two mounting rods and rotate at a same rotational speed in opposite directions;
   wherein the plurality of intermediate supporting bars includes a first intermediate supporting bar, a second intermediate supporting bar, a third intermediate supporting bar, and a fourth intermediate supporting bar which are radially disposed with respect to the fuselage; and
   wherein
   each of the first, second, third and fourth intermediate supporting bars is perpendicularly divided and
   the first intermediate supporting bar includes
   a first-first supporting bar, and a first-second supporting bar and a first-third supporting bar divided from the first-first supporting bar,
   the second intermediate supporting bar includes
   a second-first supporting bar, and a second-second supporting bar and a second-third supporting bar divided from the second-first supporting bar,
   the third intermediate supporting bar includes
   a third-first supporting bar, and a third-second supporting bar and a third-third supporting bar divided from the third-first supporting bar, and
   the fourth intermediate supporting bar includes
   a fourth-first supporting bar, and a fourth-second supporting bar and a fourth-third supporting bar divided from the fourth-first supporting bar.

2. The multi-copter of claim 1, wherein when an angle between any propeller of the two propellers and a corresponding mounting rod is a first angle and an angle between another propeller of the two propellers and another corresponding mounting rod is a second angle, and
   a difference between the first angle and the second angle is 360/2n degrees, wherein n is a number of blades of a corresponding propeller.

3. The multi-copter of claim 1, wherein the two mounting rods are perpendicular to each other.

4. A fuselage vibration control method of a multi-copter, the multi-copter including a plurality of intermediate supporting bars each having one end fixed to a multi-copter fuselage and radially extending from the fuselage, two mounting rods which are divided into two branches at respective other ends of the intermediate supporting bars, and a propeller set having two propellers mounted in respective ones of the two mounting rods, the method comprising:
- a phase angle optimizing step of fixing a first angle between any propeller of the two propellers and a corresponding mounting rod, and a second angle between another propeller of the two propellers and another corresponding mounting rod to be different by 360/2n degrees; and
- a rotating step of rotating the two propellers of the propeller set at a same rotational speed in opposite directions, wherein n is a number of blades of a corresponding propeller;
- wherein the plurality of intermediate supporting bars includes a first intermediate supporting bar, a second intermediate supporting bar, a third intermediate supporting bar, and a fourth intermediate supporting bar which are radially disposed with respect to the fuselage; and wherein
each of the first, second, third and fourth intermediate supporting bars is perpendicularly divided and
the first intermediate supporting bar includes
a first-first supporting bar, and a first-second supporting bar and a first-third supporting bar divided from the first-first supporting bar,
the second intermediate supporting bar includes
a second-first supporting bar, and a second-second supporting bar and a second-third supporting bar divided from the second-first supporting bar,
the third intermediate supporting bar includes
a third-first supporting bar, and a third-second supporting bar and a third-third supporting bar divided from the third-first supporting bar, and
the fourth intermediate supporting bar includes
a fourth-first supporting bar, and a fourth-second supporting bar and a fourth-third supporting bar divided from the fourth-first supporting bar.

* * * * *